(No Model.) 5 Sheets—Sheet 1.

C. SPOFFORD.
MACHINE FOR CUTTING PLATES OR DISHES FROM WOOD.

No. 474,766. Patented May 10, 1892.

ATTEST:
J. A. Hurdle
Joseph Kelly

INVENTOR:
Chas. Spofford (No Model.) 5 Sheets—Sheet 3.
C. SPOFFORD.
MACHINE FOR CUTTING PLATES OR DISHES FROM WOOD.
No. 474,766. Patented May 10, 1892.

ATTEST:
J A Hurdle
Joseph Kelly

INVENTOR:
Chas Spofford

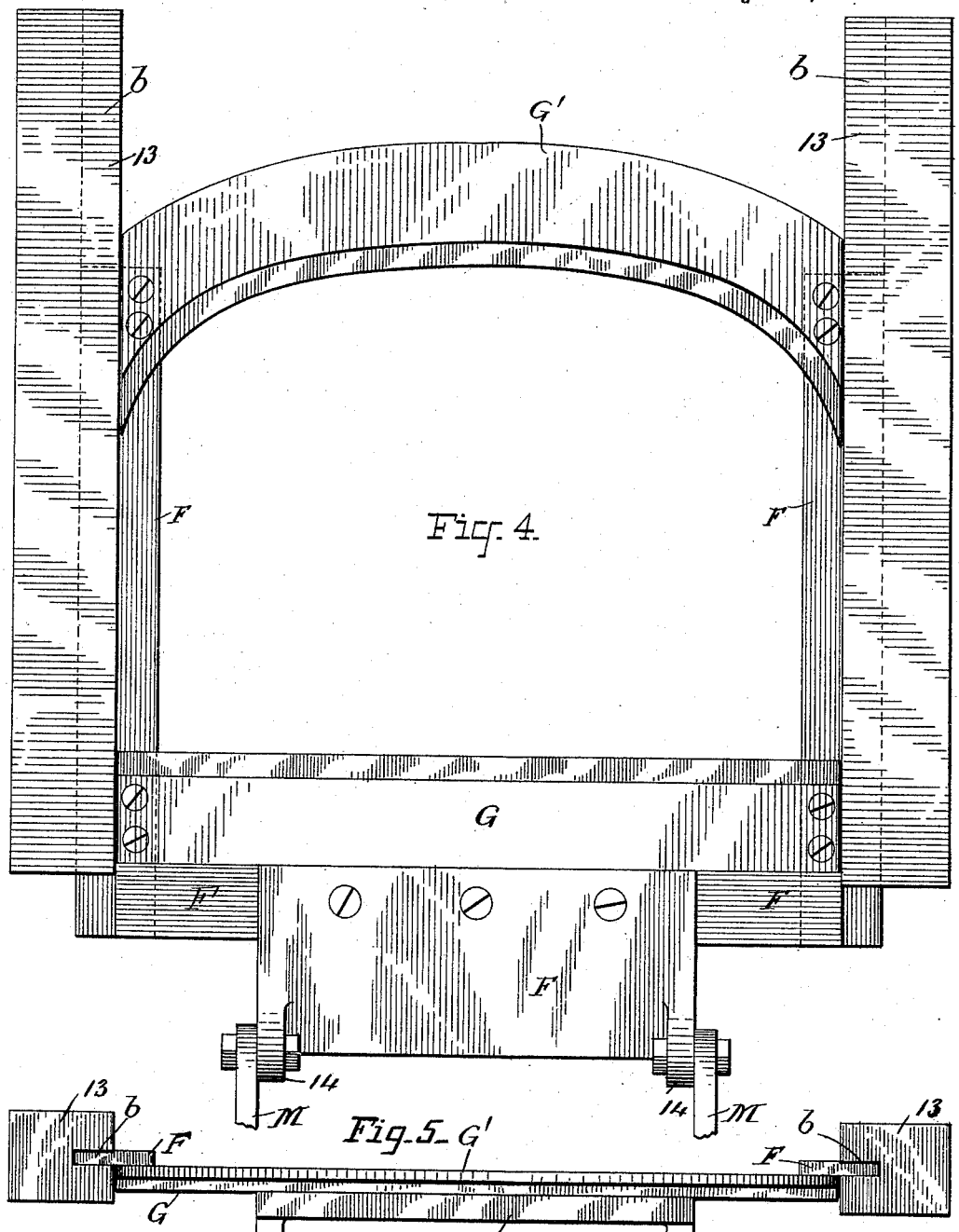

(No Model.)　　　　　　　　　　　　　　　　5 Sheets—Sheet 5.
C. SPOFFORD.
MACHINE FOR CUTTING PLATES OR DISHES FROM WOOD.
No. 474,766.　　　　　　　　　Patented May 10, 1892.

ATTEST:

INVENTOR:

UNITED STATES PATENT OFFICE.

CHARLES SPOFFORD, OF NEW YORK, N. Y., ASSIGNOR TO WILLIAM J. HISS AND WILLIAM P. SANDFORD, OF SAME PLACE.

MACHINE FOR CUTTING PLATES OR DISHES FROM WOOD.

SPECIFICATION forming part of Letters Patent No. 474,766, dated May 10, 1892.

Application filed October 29, 1891. Serial No. 410,154. (No model.)

*To all whom it may concern:*

Be it known that I, CHARLES SPOFFORD, a citizen of the United States, and a resident of New York city, in the county of New York and State of New York, have invented certain new and useful Improvements in Machines for Cutting Plates or Dishes, of which the following is a specification.

This invention relates to machines for cutting concavo-convex utensils—such as plates or dishes—from a log of wood or other similar material; and it consists in the novel construction and combination of the parts hereinafter fully described and claimed.

Figure 1:
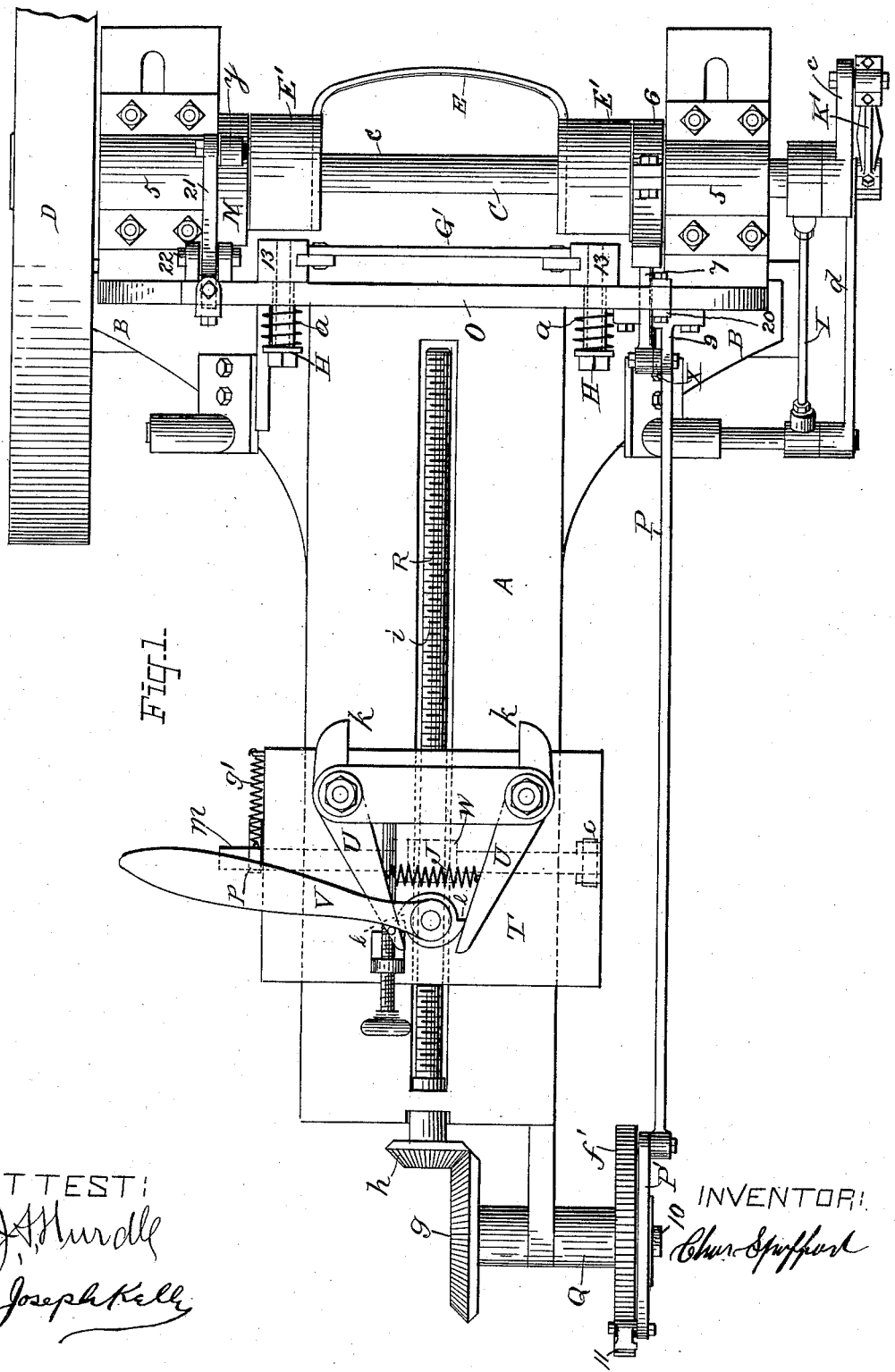
Figure 2:
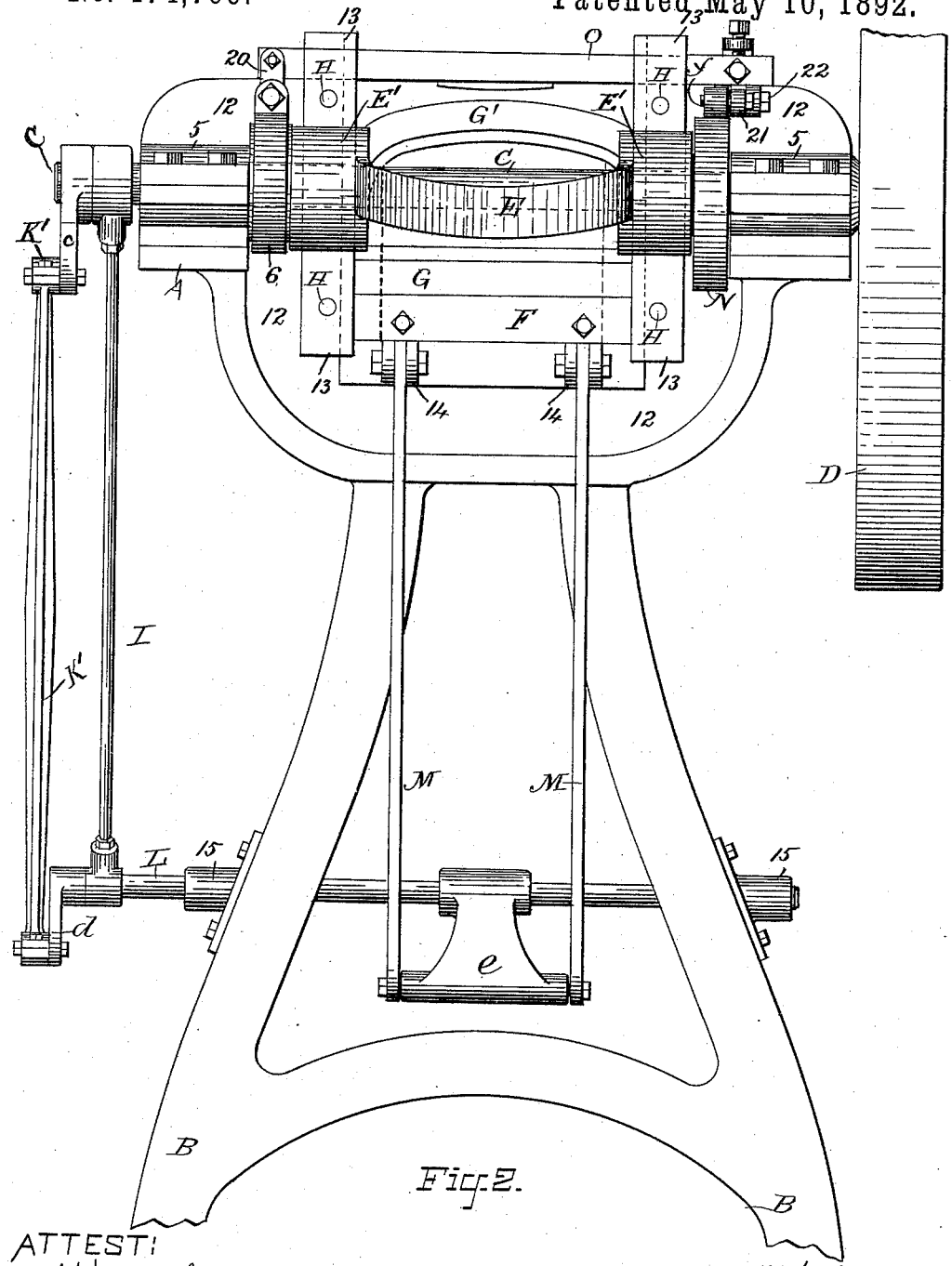
Figure 3:
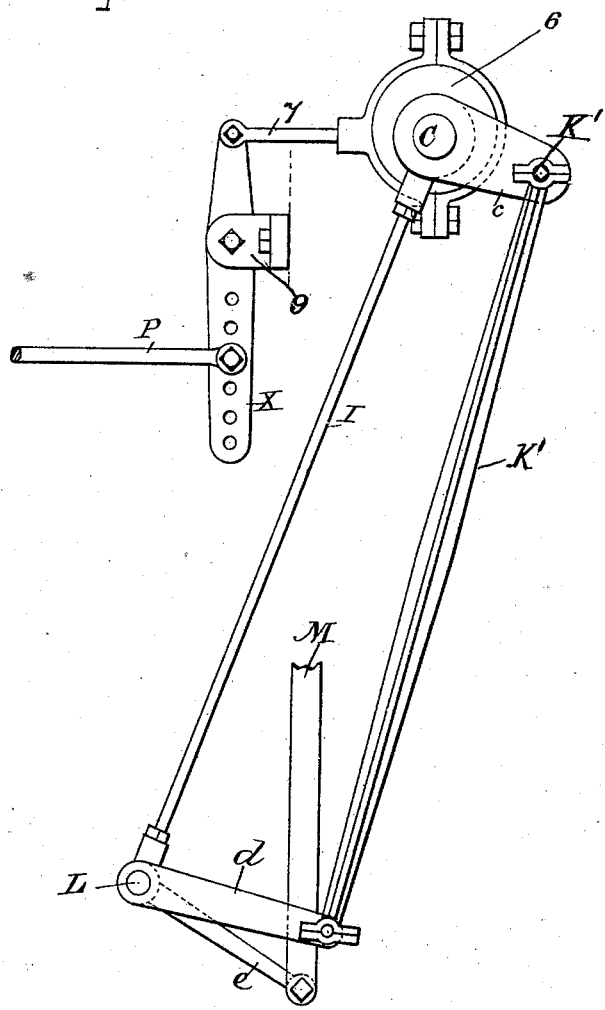
Figure 6:
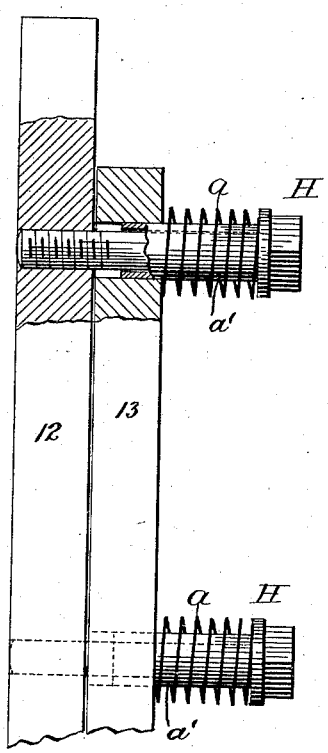

In the drawings, Figure 1 is a plan view of the machine from above. Fig. 2 is a front end view of the machine. Fig. 3 is a detail side view of the mechanism for reciprocating the facing-knives. Fig. 4 is a detail front view of the facing-knives and their guides. Fig. 5 is a plan view of the parts shown in Fig. 4. Fig. 6 is a detail side view, partly in section, showing how the slicing-knife guides are connected to the frame of the machine.

A is the main frame of the machine, supported upon legs B.

C is main driving-shaft of the machine, journaled in bearings 5 on the frame and provided with a driving-pulley D.

E is the curved cutting-off knife, provided with end bosses E', which are secured on the shaft C.

The rear end of the log is seized by the jaws k of the levers U and the log is fed forward intermittently between the cuts of the knife E by any approved feed mechanism. During the cutting stroke of the knife E the log is not fed forward, but is clamped to the frame A by clamping mechanism of any approved construction.

The feeding mechanism and the mechanism for clamping the log are the same as that fully shown and described in the Patent No. 410,299, issued to me on September 3, 1889, and is partially shown in the accompanying drawings. The log is fed forward by the feed-screw R, provided with screw-threads *i*. The levers U are pivoted to the carriage T and are pulled toward each other by the springs J. The said levers are forced apart by the pivoted hand-lever V, which is provided with the projections *l*. The carriage is provided with a lever *m*, pivoted on the pin *o*, and a half-nut *w* is carried by the lever *m* and is adapted to be placed in gear with the feed-screw, as fully set forth in the above-mentioned patent. A locking device having the spring *g'* is also provided for holding the lever *m* in its desired position. The feed-screw is driven by the eccentric 6 on the shaft C. The eccentric-rod 7 is pivoted to the upper end of the lever X, which is pivoted to the bracket 9, secured to the frame of the machine. The lower end of the lever X is provided with a series of holes, as shown in Fig. 3, so that the amount of the feed may be varied to cut thick or thin dishes from the log, as required. P is a rod pivoted at one end to the lower part of the lever X and having its other end pivoted to the plate P'. The plate P' is journaled on the end of the shaft 10, carried by the bracket Q at the rear of the machine. The shaft 10 has a ratchet-wheel *f'* and a beveled toothed wheel *g* secured on it. A pawl 11 is pivoted to the plate P' and engages with the teeth of the ratchet-wheel *f'*, so that the shaft 10 is rotated intermittently by the reciprocating rod P. A bevel-toothed pinion *h* is secured on the end of the feed-screw and is revolved by the said wheel *g*, which gears into it. O is the log-clamping lever, pivoted to the lug 20 on the frame A. This lever is operated by the cam N on the shaft C by means of the intermediate lever 21, pivoted to the frame A by the pin 22, and provided with the roller *y*, which runs on the cam N. All these parts differ in no essential respect from the corresponding parts described in the hereinbefore-mentioned Patent No. 410,299.

The frame A is provided with a flange 12 at its front end, and H are bolts which project from the flange and are adapted to support the guides 13. The bolts have springs *a* and sleeves *a'* upon them, as shown in Fig. 6, and the springs are arranged to press the guides against the front face of the flange 12.

F is a frame, which slides vertically in the grooves *b* in the guides 13, and the grooves are made a little wider than the thickness of the parts of the frame which slide in them, so that the frame may slide freely. A lower facing-blade G and an upper facing-blade G' are secured to the frame F. The cutting-edge of the blade G is preferably straight and that of the blade G' is preferably curved, so that the upper blade may enter the log gradually. The blades G G' are moved simultaneously in the same direction by the links M, the upper ends of which are pivoted to the lugs 14 of the frame F. The lower ends of the links M are pivoted to the outer end of an arm e, secured upon the rock-shaft L, which is journaled in the bearings 15, carried by the legs B. The shaft L is oscillated by means of the crank c, secured on the shaft C. An arm d is secured to one end of the shaft L, and the arm d and the crank c are operatively connected by the pitman K', as shown in Fig. 3.

I is a brace arranged between the shafts C and L for steadying them.

The operation of the machine is as follows: The log is first fed forward by the feed mechanism and clamped by the lever O. The revolving knife E then cuts off a utensil from the log. The frame F commences its descent while the knife E is cutting, and the upper knife G' enters the log just before the knife E leaves the log. The facing-knife G' continues its stroke down to the center of the log and the knife E continues on its circular path. The frame F then commences its ascent, and just after the lower facing-knife enters the log the lever O is raised by the cam N to unclamp the log and the feed mechanism commences to propel the log forward. In being fed forward the log pushes the facing-knives and their guides away from the flange 12 on the frame against the pressure of the springs a, and the knife G operates while thus being pushed forward. The facing-knives and their guides are pressed back to their original positions against the flange 12 by the springs as soon as the lower knife G completes its cut by arriving at the center of the log, and the log is then reclamped in position to have another utensil cut from it, as hereinbefore described.

What I claim is—

1. The combination, with a revoluble knife for cutting concavo-convex utensils from a log, of a reciprocatory frame and two facing-knives secured to the said frame with their cutting-edges toward each other, and driving mechanism for operating the said knife and frame, substantially as set forth.

2. The combination, with a revoluble knife for cutting concavo-convex utensils from a log, of a main frame for supporting the log, guides supported by the frame, a reciprocatory frame sliding in the said guides, two facing-knives having opposed edges and secured to the reciprocatory frame, springs normally holding the said guides against the main frame, and feed mechanism operating to advance the log between the cutting strokes of the revoluble knife and during the cutting strokes of one of the facing-knives, substantially as set forth.

3. The combination, with the main frame for supporting the log, of the guides 13, springs adapted to press the guides against the frame, and the frame and the two facing-knives having opposed edges and sliding in the said guides and which are pressed forward with the guides when the log is advanced and pressed back again by the springs on the completion of the facing of the end of the log, substantially as set forth.

4. The combination, with the main frame and the guides 13, carried by it, of the main shaft journaled in the frame, the cutting-off knife secured to the main shaft, the frame and the two facing-knives having opposed edges and sliding in the said guides, an oscillatory rock-shaft, an arm e, projecting from the rock-shaft, links pivotally connecting the said arm with the knife-frame, a crank secured on the main shaft, an arm d, secured on the rock-shaft, and a pitman connecting the arm d with the crank, whereby the cutting-off knife is revolved and the facing-knives are reciprocated, substantially as set forth.

Signed at New York, in the county of New York and State of New York, this 17th day of October, A. D. 1891.

CHAS. SPOFFORD.

Witnesses:
JOSEPH KELL,
JAMES P. FOSTER.